US010260739B2

(12) United States Patent
Treloar

(10) Patent No.: US 10,260,739 B2
(45) Date of Patent: Apr. 16, 2019

(54) PENETRATION SEAL APPARATUS AND METHOD

(71) Applicant: Nigel Treloar, Pittsburgh, PA (US)

(72) Inventor: Nigel Treloar, Pittsburgh, PA (US)

( * ) Notice: Subject to any disclaimer, the term of this patent is extended or adjusted under 35 U.S.C. 154(b) by 18 days.

(21) Appl. No.: 15/674,663

(22) Filed: Aug. 11, 2017

(65) Prior Publication Data

US 2018/0058682 A1    Mar. 1, 2018

Related U.S. Application Data

(60) Provisional application No. 62/379,375, filed on Aug. 25, 2016.

(51) Int. Cl.
| | |
|---|---|
| *F22B 37/20* | (2006.01) |
| *F16J 15/10* | (2006.01) |
| *F22B 37/10* | (2006.01) |
| *F16L 5/02* | (2006.01) |
| *F16T 1/00* | (2006.01) |
| *F16L 27/00* | (2006.01) |

(52) U.S. Cl.
CPC .............. *F22B 37/105* (2013.01); *F16L 5/02* (2013.01); *F16T 1/00* (2013.01); *F16J 15/102* (2013.01); *F16L 27/00* (2013.01)

(58) Field of Classification Search
CPC .......... F16J 15/10; F16J 15/102; F16J 15/104; F16J 15/12; F16J 15/128; F22B 37/105; F16L 5/02; F16L 27/00; F16T 1/00
See application file for complete search history.

(56) References Cited

U.S. PATENT DOCUMENTS

| | | | |
|---|---|---|---|
| 4,498,692 | A | 2/1985 | Swanson |
| 7,478,839 | B2 | 1/2009 | Barber |
| 8,087,674 | B2 | 1/2012 | Cummings |
| 8,961,225 | B2 | 2/2015 | Ilkhanov et al. |

(Continued)

FOREIGN PATENT DOCUMENTS

| | | |
|---|---|---|
| CN | 201041344 Y | 3/2008 |
| CN | 203797622 U | 8/2014 |

(Continued)

OTHER PUBLICATIONS

EagleBurgmann CB Clamshell metal expansion joints—product literature.

(Continued)

*Primary Examiner* — Gilbert Y Lee
(74) *Attorney, Agent, or Firm* — Thomas M. Joseph, Esq

(57) ABSTRACT

A tubular base plate assembly has a lower surface connected to a heating system component and an upper surface. A tubular seal plate assembly is positioned above the base plate assembly upper surface having a mating surface facing the base plate assembly upper surface with a plurality of grooves therein. Sealing material is provided within the grooves. A tubular hub assembly is positioned above the seal plate assembly. A plurality of fasteners connects the seal plate assembly to the hub. A plurality of external brackets connects the seal plate assembly to the base plate assembly to secure the seal plate assembly. The sealing material forms a first gasket between the seal plate assembly and the base plate assembly.

20 Claims, 8 Drawing Sheets

(56) References Cited

U.S. PATENT DOCUMENTS 9,091,349 B2 * 7/2015 Krowech ............... F16J 15/164

FOREIGN PATENT DOCUMENTS

JP           10259902 A2    9/1998
KR         100670195 B1    1/2007

OTHER PUBLICATIONS

EagleBurgmann PSS Penetration Slider Seal—product literature.
EagleBurgmann Metal Expansion Joints—product literature.
PenSeal Plus (Boiler Penetration Seals)—Downloaded from http:www.poweronline.com on Aug. 5, 2016.
Drew Robb, Power Engineering, "Sealing Off HRSG Heat Loss", Jul. 1, 2009.
International Search Report dated Nov. 14, 2017, issued in PCT Patent Application No. PCT/US17/046414.
CMI Energy EPTI DG8310-2 Casing Seal Types product literature.
Foster Wheeler layout of expansion joints drawing.
Erie Power Technologies, Inc. Standardized Casing Fabric Seal Designs.
Photographs of joint replacements.
Foster Wheeler technical specifications.
Foster Wheeler H. P. Superheater Support Arrangement.
Bellows Type Penetration Seal Photograph.
Clamshell Photograph.
Cramped Quarters Photograph.
HRST Pipe Penetration Seal.
Korema Fabric Penetration Seal Photograph.
Meridan Combined Cycle Facility Drawing.
Penetration Seal Photograph.

* cited by examiner

PENETRATION SEAL APPARATUS AND METHOD

CROSS REFERENCE TO RELATED APPLICATION

This application claims the benefit under 35 U.S.C. § 119(e) of U.S. Provisional Application No. 62/379,375 entitled "PENETRATION SEAL APPARATUS AND METHOD" filed Aug. 25, 2016, which is incorporated herein by reference.

BACKGROUND

The energy consumption of industrial boilers accounts for a significant portion of the total energy use within the industrial sector. One area of significant energy loss can occur where pipes enter and leave (i.e., penetrate) the boiler casing. These areas can create hot spots and thermal loss. Moreover, these areas include joints that represent vulnerabilities that can result in unplanned shutdowns and/or risks to operational and personnel safety. Thus, the penetrations in these areas must be protected with seals to ensure the efficient, safe operation of industrial boilers.

In some instances, the industrial boilers must use seals that are designed to be installed during the construction phase of a project (i.e., before the pipes are closed and tested). Good engineering practice dictates that these seals have a theoretical life that is equal to or greater than the plant in which the seals are to be installed.

Existing standards dictate that, once an industrial boiler system is in operational mode, any mechanical rework, such as grinding or welding on pipes carrying superheated steam, must be heat treated and/or stress relieved before the system can be put back in service. As a result, the replacement of a failed seal for such a system can be a prohibitively expensive procedure.

One technique that can be used to protect a boiler casing joint is to use a fabric conical seal that attaches to a pipe and to a standoff with clamps. A standoff is a raised structure that is welded to a casing plate that surrounds a pipe that penetrates through the casing plate. The fabric conical seal produces a seal that is inexpensive, has zero deflection forces, and is easy to install. However, such seals are susceptible to damage, have poor sealing characteristics, and are suitable for low temperature applications only.

A bellows-type seal can also be used to protect boiler casing joints. Such seals are made of thin gage stainless steel that is formed into convolutions. One end of the convolution is welded to an internal ring. The other end of the convolution is welded to an external ring. The internal ring can be welded to the outside of the pipe. The external ring can be welded to a casing plate that is penetrated by the pipe.

The repair technique for the bellows uses a clamshell design. The clamshell design involves manufacturing a replacement bellows-type seal and cutting it into two pieces along a length. The two pieces are placed around a pipe and are welded together before end rings can be attached. The end rings are an internal ring for the pipe and an external ring to the casing plate. Also, the spring rate (i.e., the force to deflect the bellows) of a clamshell creates an additional external force, which may be undesirable.

The advantages for these bellows-type seals are that they are inexpensive and simple to install. They also have good sealing characteristics and do not require service. However, bellows-type seals are susceptible to mechanical damage and cannot be replaced easily.

A packed-type seal is another type of seal that can be used to protect boiler casing joints. Packed-type seals include discs of insulation that are packed around a pipe at the point at which the pipe penetrates through the casing wall. The discs can be held into place with a bolted seal plate or flange. The insulation can be made from mineral wool, ceramic fiber, or other similar materials.

The packed-type seals can be inexpensive, easy to install, and have zero deflection forces. However, the seals can be susceptible to damage and can have poor sealing characteristics.

Another technique for sealing a boiler casing joint includes using a multi-laminar fabric seal. Such seals include a standoff that is welded to a casing plate, a pan weldment that is welded to the outside of a pipe, mineral wool or other similar insulation material for the void, and a belt-type seal which is attached with clamp bars.

The advantage of multi-laminar fabric seals is that the seals can have minimal deflection forces and can be installed after the system is put in service. Also, such seals can be used for multiple penetrations. However, such seals are expensive, bulky, difficult to install, and are susceptible to mechanical damage. In view of the above, there is a need for an improved penetration seal for boiler casings.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, an apparatus for forming a penetration seal on a heating system component, such as a boiler casing or a heat exchanger, includes a tubular base plate assembly having a lower surface connected to the heating system component and an upper surface. A tubular seal plate assembly is positioned above the base plate assembly upper surface having a mating surface facing the base plate assembly upper surface with a plurality of grooves therein. Sealing material is provided within the grooves. A tubular hub assembly is positioned above the seal plate assembly. A plurality of fasteners connects the seal plate assembly to the hub assembly. A plurality of external brackets connects the seal plate assembly to the base plate assembly to secure the seal plate assembly. The sealing material forms a first gasket between the seal plate assembly and the base plate assembly.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

Figure 1A:
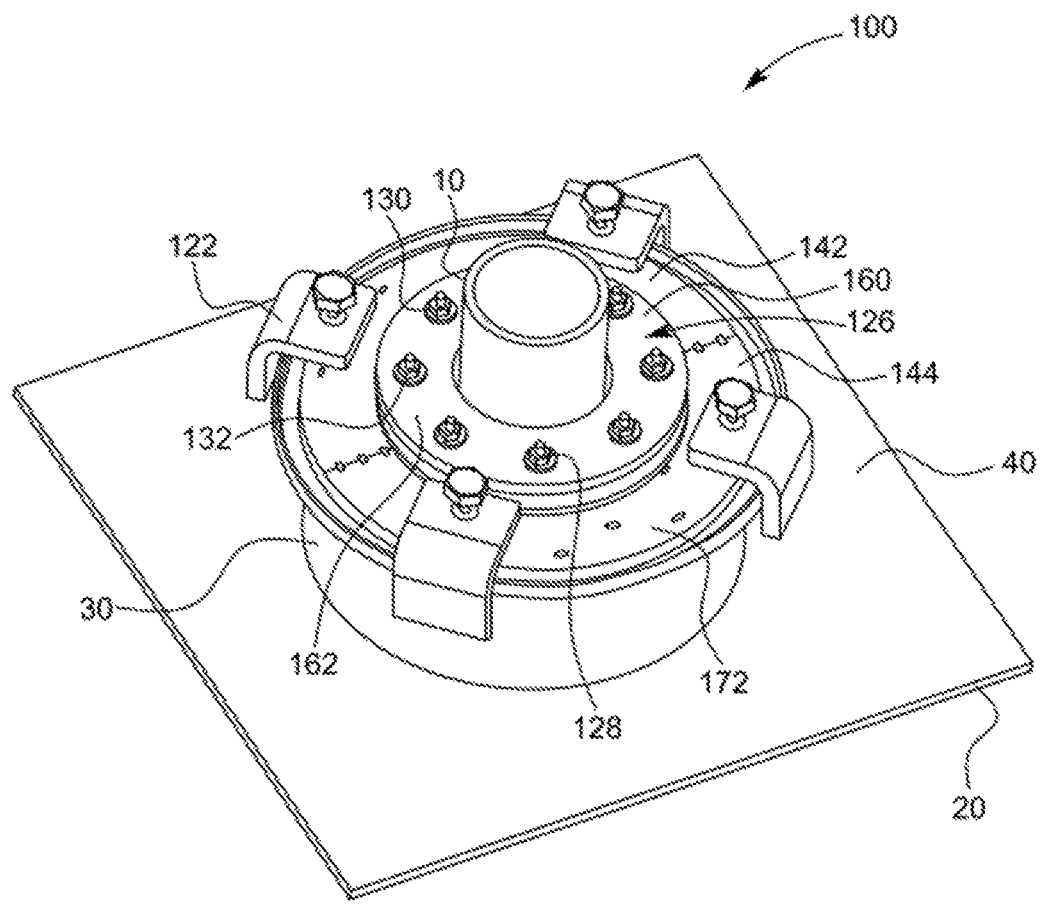
FIG. 1A illustrates a perspective view of a penetration seal in accordance with aspects of the described subject matter.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more aspects of the described subject matter. It is to be appreciated, however, that such aspects can be practiced without these specific details.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Referring to FIGS. 1A-1D, a fully serviceable and adjustable sealing device, generally designated as 100, is shown. The sealing device 100 is designed to be installed around a pipe, a conduit, or other similar entity, generally designated as 10. The pipe 10 passes through or penetrates a boiler wall or plate, which is generally designated as 20. The boiler plate 20 includes a standoff 30 that projects upwardly from a boiler plate upper surface 40 to surround the pipe 10.

The sealing device 100 can be positioned directly on the casing wall outer surface 40 or above the standoff 30, so that the standoff 30 forms a base to support the sealing device 100. The sealing device 100 is positioned over the standoff to insulate and to seal the joint between the pipe 10 and the boiler plate 20. The sealing device 100 permits unrestricted movement of the pipe 10 and serves as a gland packing box. The sealing device 100 provides both enhanced sealing characteristics, simplified installation, and simplified maintenance.

The sealing device 100 includes a base plate assembly 102, a seal plate assembly 104, a hub assembly or cap 106, a first seal or gasket 108, and a second seal or gasket 110. Preferably, the base plate assembly 102, the seal plate assembly 104, the hub assembly 106, the first seal 108, and the second seal 110 are tubular, annular rings that are aligned concentrically around the pipe 10.

The sealing device 100 can be packaged and sold as a single kit with the base plate assembly 102, the seal plate assembly 104, the hub assembly 106, the first seal 108, and the second seal 110 being individual components of the kit. Alternatively, the base plate assembly 102, the seal plate assembly 104, the hub assembly 106, the first seal 108, and the second seal 110 can be sold individually, with other components, or in various combinations, thereof.

Figure 1B:
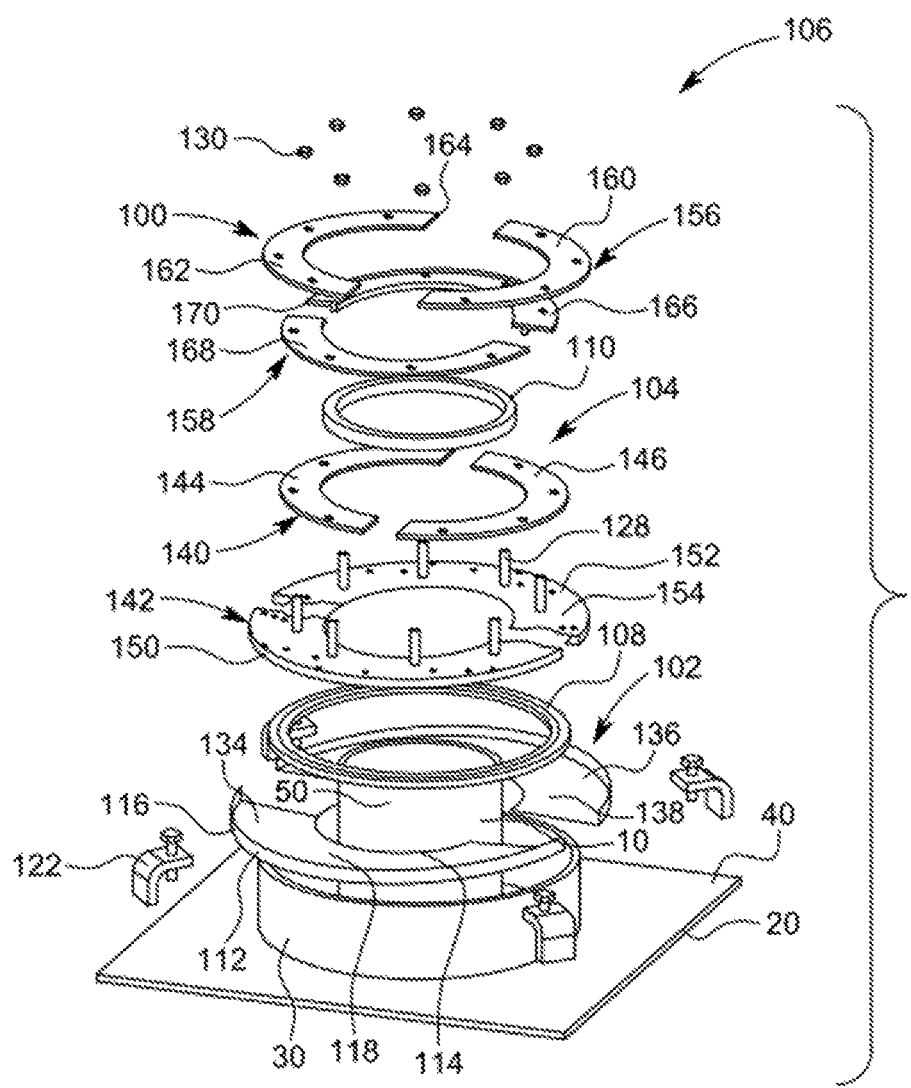
FIG. 1B illustrates an exploded perspective view of the penetration seal shown in FIG. 1A in accordance with aspects of the described subject matter.
Figure 1C:
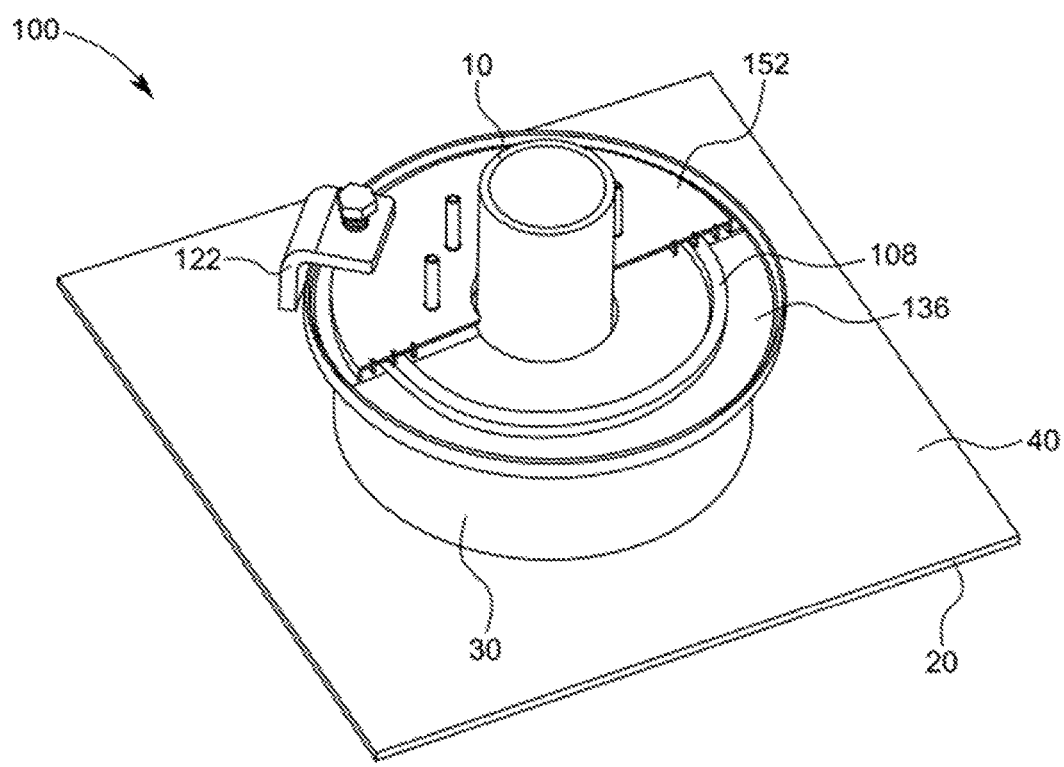
FIG. 1C illustrates a perspective view of a bracket and a bolt as utilized with a base plate, a seal plate, and graphite annular seals in accordance with aspects of the described subject matter.
Figure 1D:
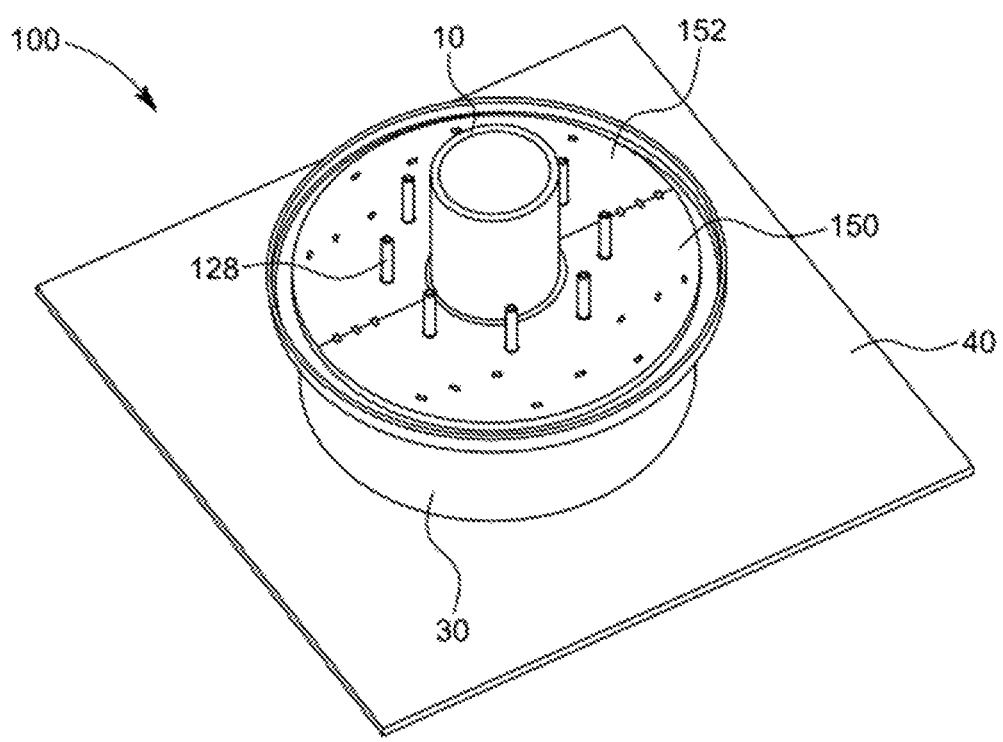
FIG. 1D illustrates a perspective view of a partially assembled penetration seal in accordance with aspects of the described subject matter.

As shown in FIG. 1B, the base plate assembly 102 can be positioned over the standoff 30 or directly on the boiler plate 20. Preferably, the base plate assembly lower surface 112 is welded to the standoff 30 or to the boiler plate 20.

The base plate assembly 102 includes an inner bore 114 that can allow the pipe 10 to penetrate through the base plate assembly 102. The base plate assembly 102 can be provided in standard sizes or in custom dimension to allow the bore 114 to have a predetermined diameter that allows for a snug fit with an outer surface 50 of the pipe 10. The base plate assembly 102 can have a raised annular ring 116 formed along an outer edge and an upper surface 118.

The seal plate assembly 104 is an essentially annular ring that includes an inner bore 120. The inner bore 120 allows for the insertion of the pipe 10 through the seal plate assembly 104, so that the seal plate assembly 104 can be positioned over the base plate assembly upper surface 118.

A plurality of spaced-apart external brackets 122 connects the base plate assembly 102 to the seal plate assembly 104. The brackets 122 are arranged in a symmetrical, predetermined pattern to distribute pressure evenly.

As shown in FIGS. 1A-1B, the hub assembly 106 is positioned above the seal plate assembly 104. The hub assembly 106 is an essentially tubular, annular ring that includes an inner bore 124. The pipe 10 can be inserted into the inner bore 124. A plurality of fasteners 126 connects the seal plate assembly 104 to the hub assembly 106. Each fastener 126 includes a threaded stud 128 that is between two and three inches in length, a nut 130, and a disc spring 132. The studs 128 can be tightened to ensure that the hub assembly 106 makes an axial seal against the seal plate assembly 104.

The brackets 122 and the fasteners 126 hold the base plate assembly 102, the seal plate assembly 104, and the hub assembly 106 in place, while providing for adjustment of the relative positions of the components, in the assembled sealing device 10.

The brackets 122, the fasteners 126, and the seals 108-110 maintain seals between the base plate assembly 102 and the seal plate assembly 104 when pressure is applied perpendicularly in the direction of flow within the pipe 10.

As shown in FIG. 1B, the base plate assembly 102 can be formed from two half round sections 134-136 split along a centerline 138. The half round sections 134-136 can be positioned around a penetration opening in the boiler plate 20 and welded together. The penetration opening can receive the pipe 10. It should be understood that the base plate assembly 102 can also be formed from multiple layers of plates.

The seal plate assembly 104 includes an upper plate 140 and a lower plate 142. The upper plate 140 can be formed from two half round sections 144-146 split along a centerline 148 to form butt joints. The lower plate 142 can be formed from two half round sections 150-152 split along another centerline 154 to form butt joints. The centerline 148 is perpendicular to the centerline 154 in the assembled sealing device 100, so that the butt joints are offset by 90 degrees.

The hub assembly 106 includes an upper plate 156 and a lower plate 158. The upper plate 156 can be formed from two half round sections 160-162 split along a centerline 164 to form butt joints The lower plate 158 can be formed from two half round sections 166-168 split along another centerline 170 to form butt joints. The centerline 164 is perpendicular to the centerline 170 in the assembled sealing device 100, so that the butt joints are offset by 90 degrees.

The base plate assembly 102, the seal plate assembly 104, and the hub assembly 106 can be made by any suitable manufacturing method from any suitable material. Suitable materials include flexible, semi-flexible, rigid, or semi-rigid materials. Preferably, suitable materials include metals and, most preferably, stainless steel.

The seals 108-110 can be made from any suitable material. Preferably, the seals 108-110 are made from an expanded flexible graphite or a graphite composite, such as an Inconel reinforced graphite.

The bracket 122 can be made by any suitable manufacturing method from any suitable material. Suitable materials include flexible, semi-flexible, rigid, or semi-rigid materials. Preferably, suitable materials include metals and, most preferably, stainless steel.

The fasteners 126 can be made by any suitable manufacturing method from any suitable material. Suitable materials include flexible, semi-flexible, rigid, or semi-rigid materials. Preferably suitable materials include metals and most suitably phosphor bronze, so that the coefficient of friction between the fasteners 126 and the seal plate 140 and 142 is not significant enough to affect the sealing properties of the sealing device 100. The studs 128 can be made from an A108 low carbon steel or 300 series stainless steel.

The use of phosphor bronze also permits lateral movement of the seal plate. However, it should be understood that stainless steel fasteners can be used in alternate embodiments in combination with graphite packed pad attached to an end of a bolt to provide a larger contact area. In some embodiments, a pressure pad is used in place of the phosphor bronze bolts or fasteners.

Figure 2:
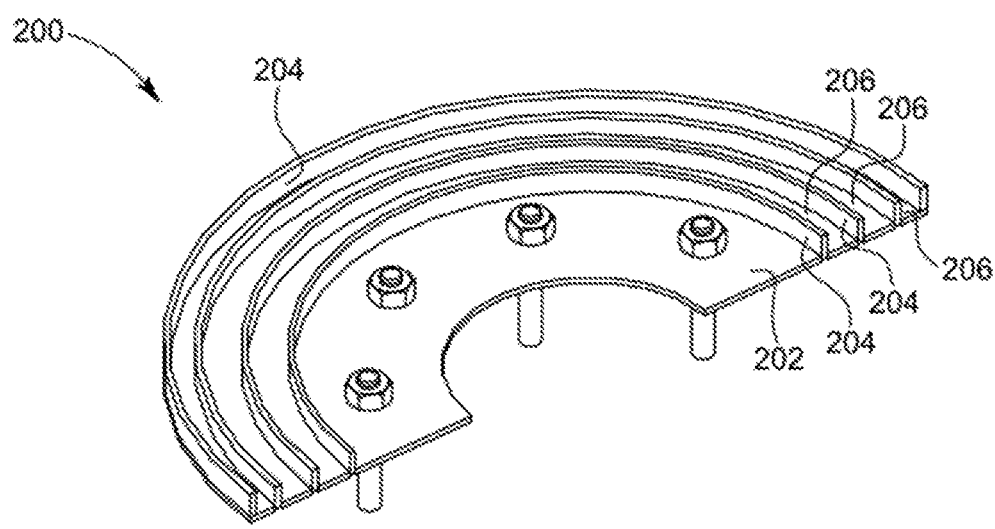
FIG. 2 illustrates a perspective view of a portion of a seal plate assembly in accordance with aspects of the described subject matter.

Referring now to FIG. 2 with continuing reference to the foregoing figures, there is shown a half round section of a seal plate assembly, generally designated as 200, that can implement aspects of the described subject matter. The half round section 200 is essentially equivalent to the half round sections 150-152 shown in FIG. 1B. The half round section 200 can be used to form the seal 108 shown in FIG. 1B.

The half round section 200 includes a mating surface 202 that has a plurality of raised rims 204. The raised rims 204 form grooves 206 for holding sealing material (not shown). The sealing material can form gaskets when the half round section 200 is inverted, so that the mating surface 202 faces the base plate assembly upper surface 118 in an assembled sealing device 100 shown in FIG. 1.

Figure 3:
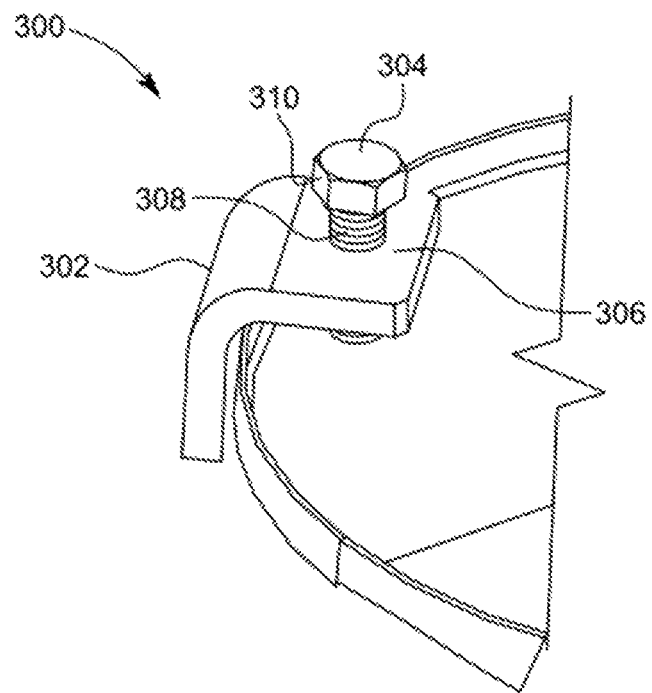
FIG. 3 illustrates a fragmentary perspective view of an external bracket in accordance with aspects of the described subject matter.

Referring now to FIG. 3 with continuing reference to the foregoing figures, there is shown a bracket, generally designated as 300, that can implement aspects of the described subject matter. The bracket 300 is essentially equivalent to the brackets 122 shown in FIGS. 1A-1D. The bracket 300 can connect the base plate assembly 102 to the seal plate assembly 104 shown in FIGS. 1A-1D.

The bracket 300 includes a bracket body 302 and an adjustment member 304. The bracket body 302 can include a threaded bore 306. The adjustment member 304 includes a threaded member 308 and a head 310. The adjustment member 304 can be a bolt.

The threaded bore 306 is configured to receive the threaded shaft 308. The threaded shaft 308 can be tightened through rotation to penetrate the threaded bore 306 until it is either stopped through friction or through engagement of the head 310.

Figure 4:
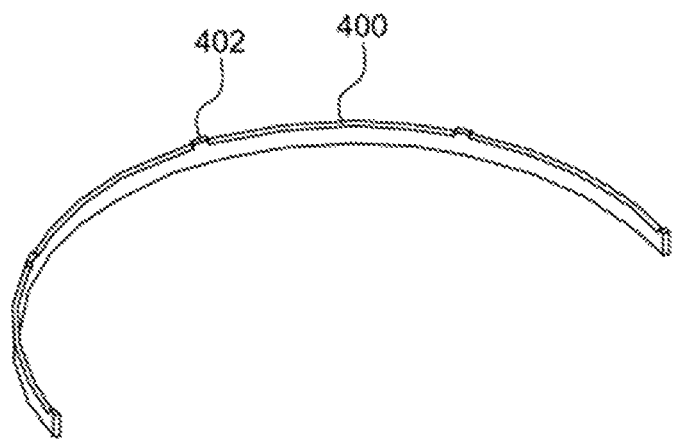
FIG. 4 illustrates a perspective view of a portion of a seal assembly in accordance with aspects of the described subject matter.

Referring now to FIG. 4 with continuing reference to the foregoing figures, there is shown a raised annular ring, generally designated as 400, that can implement aspects of the described subject matter. The raised annular ring 400 is essentially equivalent to the raised annular ring 116 formed along an outer edge of the upper surface 118 of the base plate assembly 102 in FIGS. 1A-1D.

The raised annular ring 400 includes a plurality of raised tabs 402 that can be inserted into slots 172 shown in FIG. 1A. Once the tabs 402 are inserted into the slots 172, the tabs 402 are spot welded and are ground flat.

Exemplary Processes

Figure 5:
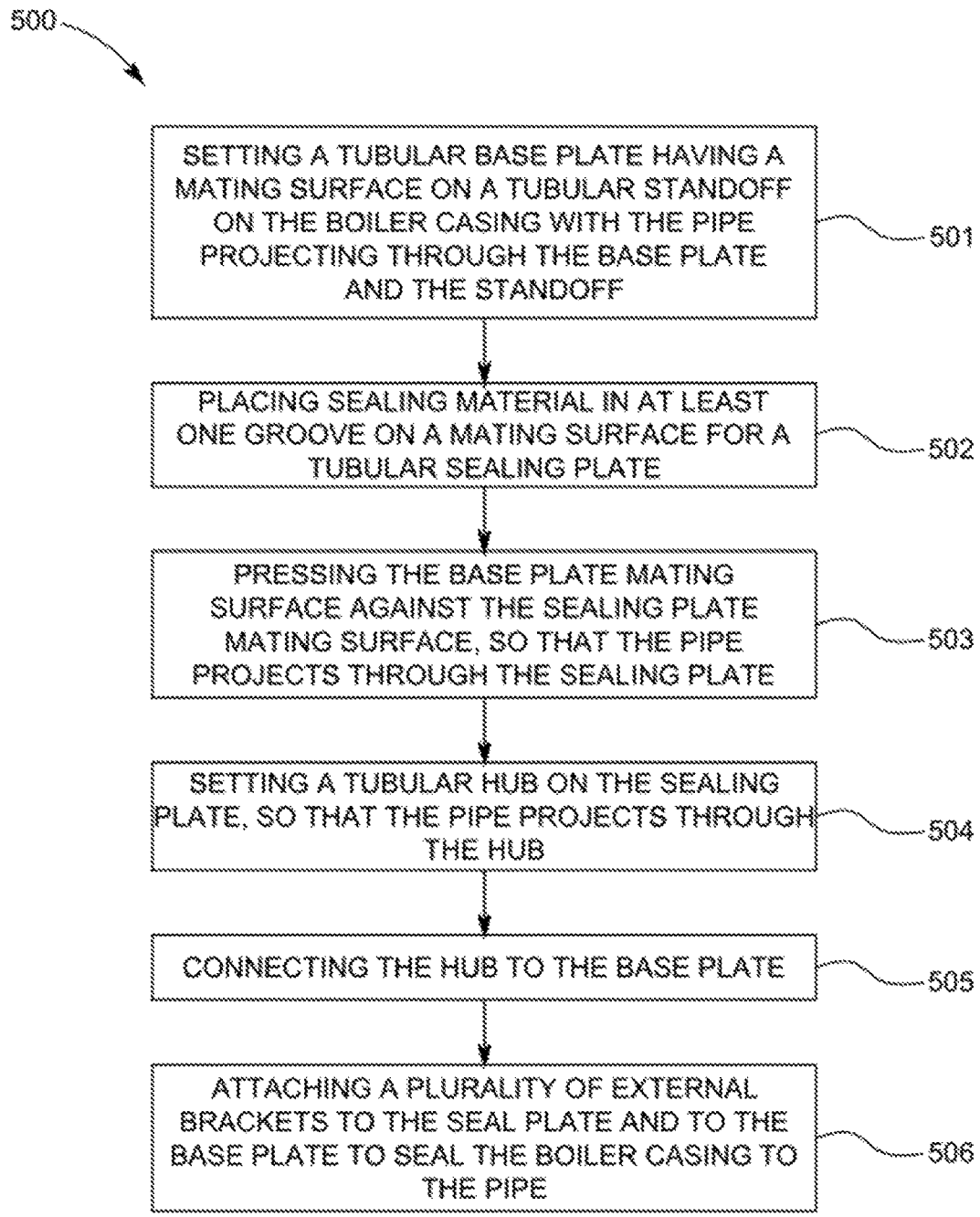
FIG. 5 illustrates an embodiment of an exemplary process in accordance with aspects of the described subject matter.

Referring to FIG. 5 with continuing reference to the foregoing figures, a method 800 for assembling a sealing device in accordance with aspects of the described subject matter is shown. The method 500, or portions thereof, can be performed to assemble the sealing device 100 shown in FIGS. 1A-1D.

At 501, a tubular base plate having a mating surface is set on a tubular standoff on the boiler casing with the pipe projecting through the base plate and the standoff. In this exemplary embodiment, the pipe can be pipe 10. The standoff can be standoff 30. The base plate can be base plate assembly 102.

At 502, sealing material is placed in at least one groove on a mating surface for a tubular sealing plate. In this exemplary embodiment, the groove can be one of the grooves 206 in the mating surface 202 shown in FIG. 2. The sealing plate can be the sealing plate assembly 104 shown in FIGS. 1A-1D.

At 503, the base plate mating surface is pressed against the sealing plate mating surface, so that the pipe projects through the sealing plate. In this exemplary embodiment, the sealing plate mating surface can be upper surface 118 shown in FIGS. 1A-1D. The base plate mating surface can be the mating surface 202 shown in FIG. 2.

At 504, a tubular hub is set on the sealing plate, so that the pipe projects through the hub. The sealing plate and the hub can be the sealing plate assembly 104 and the hub assembly 106 shown in FIGS. 1A-1D.

At 505, the hub is connected to the base plate. In this exemplary embodiment, the base plate can be base plate assembly 102 shown in FIGS. 1A-1D.

At 506, a plurality of external brackets is attached to the seal plate and to the base plate to seal the boiler casing to the pipe. In this exemplary embodiment, the brackets can be the brackets 122 shown in FIGS. 1A-1D and/or the bracket 300 shown in FIG. 3. Similarly, the pipe, the boiler casing, the base plate, and the seal plate can be pipe 10, boiler plate 20, base plate assembly 102, and seal plate assembly 104.

Supported Aspects

The detailed description provided above in connection with the appended drawings explicitly describes and supports various aspects of a penetration seal in accordance with the described subject matter. By way of illustration and not limitation, supported aspects include an apparatus for forming a penetration seal on a heating system component comprising: a tubular base plate assembly having a lower surface connected to the heating system component and an upper surface, a tubular seal plate assembly positioned above the base plate assembly upper surface having a mating surface facing the base plate assembly upper surface with a plurality of grooves therein, a sealing material within the grooves, a tubular hub assembly positioned above the seal plate assembly, a plurality of fasteners to connect the seal plate assembly to the hub assembly, and a plurality of external brackets to connect the seal plate assembly to the base plate assembly to secure the seal plate assembly, wherein the sealing material forms a first gasket between the seal plate assembly and the base plate assembly.

Supported aspects include the foregoing apparatus, wherein the base plate assembly, the seal plate assembly, and the hub assembly are annular rings.

Supported aspects include any of the foregoing apparatuses, wherein the base plate assembly, the seal plate assembly, and the hub assembly are concentric annular rings.

Supported aspects include any of the foregoing apparatuses, wherein the base plate assembly, the seal plate assembly, and the hub assembly include a pair of plates.

Supported aspects include any of the foregoing apparatuses, wherein the plurality of fasteners include studs and disc springs.

Supported aspects include any of the foregoing apparatuses, wherein the base plate assembly, the seal plate assembly, the hub assembly, and the brackets and the studs are made from stainless steel.

Supported aspects include any of the foregoing apparatuses, wherein further comprising: a second gasket positioned between the pipe and the hub assembly.

Supported aspects include any of the foregoing apparatuses, wherein the first gasket and the second gasket include a flexible graphite composite.

Supported aspects include any of the foregoing apparatuses, wherein the first gasket and the second gasket are concentric annular gaskets.

Supported aspects include a method, a system, and/or means for implementing any of the foregoing apparatuses or portions thereof.

Supported aspects include an apparatus for forming a penetration seal between a heating system component and a pipe comprising: a tubular base plate assembly positioned above the heating system component with the pipe extending therethrough, means for connecting the base plate assembly to the heating system component, a tubular seal plate assembly positioned above the base plate assembly with the pipe extending though the seal plate assembly, means for sealing the seal plate assembly against the base plate assembly, a tubular hub assembly positioned above the seal plate assembly with the pipe extending through the hub assembly, means for connecting the seal plate assembly to the hub assembly, and means for connecting the seal plate assembly to the base plate assembly.

Supported aspects include the foregoing apparatus, further comprising means for sealing the seal plate assembly against the hub assembly.

Supported aspects include any of the foregoing apparatuses, wherein the base plate assembly, the seal plate assembly, and the hub assembly are concentric annular rings.

Supported aspects include a method, a system, and/or means for implementing any of the foregoing apparatuses or portions thereof.

Supported aspects include a kit for forming a penetration seal on a heating system component comprising: a base plate assembly having a lower surface for connecting to the heating system component and an upper surface, a seal plate assembly having a lower surface for mating with the upper surface of the base plate assembly, the lower surface having a plurality of grooves therein, sealing material for inserting into the grooves, a hub assembly, a plurality of fasteners for connecting the seal plate assembly to the hub assembly, and a plurality of external brackets for connecting the seal plate assembly to the base plate assembly.

Supported aspects include the foregoing kit, wherein the base plate assembly, the seal plate assembly, and the hub assembly are annular rings.

Supported aspects include any of the foregoing kits, wherein the base plate assembly, the seal plate assembly, and the hub assembly include a pair of plates.

Supported aspects include any of the foregoing kits, wherein the plurality of fasteners include studs and disc springs.

Supported aspects include any of the foregoing kits, wherein the base plate assembly, the seal plate assembly, the hub assembly, and the brackets and the studs are made from stainless steel.

Supported aspects include any of the foregoing kits, further comprising a second sealing material configured to form a seal between pipe and the hub assembly.

Supported aspects include any of the foregoing kits, wherein the first sealing material and the second sealing material include a flexible graphite composite.

Supported aspects include any of the foregoing kits, wherein the first sealing material and the second sealing material are annular gaskets.

Supported aspects include a method, a system, an apparatus, and/or means for implementing any of the foregoing kits or portions thereof.

Supported aspects include a penetration seal for a heating system component and pipe extending therethrough, wherein the heating system component includes an annular tubular standoff projecting therefrom, and wherein the standoff surrounds the pipe, the penetration seal comprising: a tubular annular base plate component connected to the standoff with the pipe projecting therethrough, a tubular annular seal plate component above the base plate component with the pipe projecting therethrough, a first gasket positioned between the base plate component and the seal plate component, a tubular annular cap above the seal plate component with the pipe projecting therethrough, a plurality of fasteners to connect the seal plate component to the cap, and a plurality of external brackets to connect the seal plate component to the base plate component to secure the seal plate component to the standoff.

Supported aspects include the foregoing penetration seal, wherein the base plate component, the seal plate component, and the cap are concentric.

Supported aspects include any of the foregoing penetration seals, wherein the base plate component includes an upper plate formed from two half round sections split along a centerline of the upper plate, a lower plate formed from two half round sections split along a centerline of the lower plate, and the centerline of the upper plate is perpendicular to the centerline of lower plate.

Supported aspects include any of the foregoing penetration seals, wherein the seal plate component includes an upper plate formed from two half round sections split along a centerline of the upper plate, a lower plate formed from two half round sections split along a centerline of the lower plate, and the centerline of the upper plate is perpendicular to the centerline of lower plate.

Supported aspects include any of the foregoing penetration seals, wherein the cap includes an upper plate formed from two half round sections split along a centerline of the upper plate, a lower plate formed from two half round sections split along a centerline of the lower plate, and the centerline of the upper plate is perpendicular to the centerline of lower plate.

Supported aspects include any of the foregoing penetration seals, wherein the plurality of fasteners include studs and disc springs.

Supported aspects include any of the foregoing penetration seals, wherein the base plate component, the seal plate component, the cap, and the brackets and the studs are made from stainless steel.

Supported aspects include any of the foregoing penetration seals, further comprising: a second gasket positioned between the seal plate component and the cap.

Supported aspects include any of the foregoing penetration seals, wherein the first gasket and the second gasket include a flexible graphite composite.

Supported aspects include any of the foregoing penetration seals, wherein the first gasket and the second gasket are concentric annular gaskets.

Supported aspects include a method, a system, an apparatus, a kit and/or means for implementing any of the foregoing penetration seals or portions thereof.

Supported aspects include a method for sealing a heating system component and a pipe projecting therefrom, the method comprising: setting a tubular base plate having a mating surface on a tubular standoff on the heating system component with the pipe projecting through the base plate and the standoff, placing sealing material in at least one groove on a mating surface for a tubular sealing plate, pressing the base plate mating surface against the sealing plate mating surface, so that the pipe projects through the sealing plate, setting a tubular hub on the sealing plate, so that the pipe projects through the hub, connecting the hub to the base plate, and attaching a plurality of external brackets to the sealing plate and to the base plate to seal the heating system component to the pipe.

Supported aspects include the foregoing method, further comprising: connecting the hub to the base plate with a plurality of fasteners.

Supported aspects include any of the foregoing methods, wherein the plurality of fasteners include studs and disc springs.

Supported aspects include any of the foregoing methods, wherein the base plate, the sealing plate, the hub, and the brackets and the studs are made from stainless steel.

Supported aspects include any of the foregoing methods, further comprising placing another sealing material between the sealing plate and the hub.

Supported aspects include any of the foregoing methods, wherein the first sealing material and the second sealing material include a flexible graphite composite.

Supported aspects include any of the foregoing methods, wherein the first sealing material and the second sealing material are concentric annular gaskets.

Supported aspects include any of the foregoing methods, further comprising: welding the base plate to the standoff.

Supported aspects include any of the foregoing methods, wherein the base plate, the sealing plate, and the hub are concentric.

Supported aspects include a system, an apparatus, a kit and/or means for implementing any of the foregoing methods or portions thereof.

Supported aspects include a kit for forming a penetration seal for a heating system component and pipe extending therethrough, wherein the heating system component includes an annular tubular standoff projecting therefrom, and wherein the standoff surrounds the pipe, the kit comprising: an annular base plate component for connecting to the standoff and having a bore for projecting the pipe therethrough, an annular seal plate component having a bore for projecting the pipe therethrough, a first gasket configured to form a seal between an upper surface of the base plate component and a lower surface of the seal plate component, an annular cap having a bore for projecting the pipe therethrough, a plurality of fasteners configured to connect an upper surface of the seal plate component to a lower surface of the cap, and a plurality of external brackets configured to connect the seal plate component to the base plate component to seal the heating system component to the pipe.

Supported aspects include a method, an apparatus, a system, and/or means for implementing the kit or portions thereof.

Supported aspects can provide various attendant and/or technical advantages in terms of improved efficiency and/or savings with respect to penetration seals, such as a simple and outstanding penetration seal that can be installed quickly and easily by plant maintenance personnel and offers significant savings to the operator.

By way of illustration and not limitation, various features and implementations in accordance with the described subject matter include a penetration seal that has a split design that does not require additional welding or grinding, once a base plate is attached to a standoff or boiler plate.

Supported aspects include a penetration seal that includes multiple components that are split along their centerline for easy installation.

Supported aspects include a penetration seal that has sealing characteristics that are enhanced through the use of a high temperature gasket between the contact surfaces.

Supported aspects include a penetration seal in which the contact surfaces between the individual components are made from low friction, high temperature materials that prevent the internal hot gases escaping and, simultaneously, permit the specified movement of the parts being sealed and/or the individual components of the device.

Supported aspects include a penetration seal in which a circumferential force is exerted on the seal rings by an end cap to create and to maintain the penetration seal in place.

Supported aspects include a penetration seal in which a portion of the material that is to be deposited on the surface of the seal component fills surface irregularities to enhance seal quality.

Supported aspects include embodiments in which base plate assemblies, seal plate assemblies, and/or hub assemblies are made from unitary/single piece components, integral components, as well as multiple components.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. For example, the fasteners can include disc springs, such as Belleville springs and/or Belleville washers. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An apparatus for forming a penetration seal on a heating system component comprising:
    a tubular base plate assembly having a lower surface connected to the heating system component and an upper surface,
    a tubular seal plate assembly positioned above the base plate assembly upper surface having a mating surface facing the base plate assembly upper surface with a plurality of grooves therein,
    a sealing material within the grooves,
        a tubular hub assembly positioned above the seal plate assembly,
        a plurality of fasteners to connect the seal plate assembly to the hub assembly, and
        a plurality of external brackets to connect the seal plate assembly to the base plate assembly to secure the seal plate assembly,
        wherein the sealing material forms a first gasket between the seal plate assembly and the base plate assembly.

2. The apparatus of claim 1, wherein the base plate assembly, the seal plate assembly, and the hub assembly are annular rings.

3. The apparatus of claim 1, wherein the base plate assembly, the seal plate assembly, and the hub assembly are concentric annular rings.

4. The apparatus of claim 3, wherein the base plate assembly, the seal plate assembly, and the hub assembly include a pair of plates.

5. The apparatus of claim 1, wherein the plurality of fasteners include studs and disc springs.

6. The apparatus of claim 5, wherein the base plate assembly, the seal plate assembly, the hub assembly, and the brackets and the studs are made from stainless steel.

7. The apparatus of claim 1, further comprising:
    a second gasket positioned between a pipe extending from the heating system component and the hub assembly.

8. The apparatus of claim 7, wherein the first gasket and the second gasket include a flexible graphite composite.

9. The apparatus of claim 7, wherein the first gasket and the second gasket are concentric annular gaskets.

10. An apparatus for forming a penetration seal between a heating system component and a pipe comprising:
    a tubular base plate assembly positioned above the heating system component with the pipe extending therethrough,
    means for connecting the base plate assembly to the heating system component,
    a tubular seal plate assembly positioned above the base plate assembly with the pipe extending though the seal plate assembly,
    means for sealing the seal plate assembly against the base plate assembly,
    a tubular hub assembly positioned above the seal plate assembly with the pipe extending through the hub assembly,
    means for connecting the seal plate assembly to the hub assembly, and
    means for connecting the seal plate assembly to the base plate assembly.

11. The apparatus of claim 10, further comprising means for sealing the seal plate assembly against the hub assembly.

12. The apparatus of claim 10, wherein the base plate assembly, the seal plate assembly, and the hub assembly are concentric annular rings.

13. A kit for forming a penetration seal on a heating system component comprising:
    a base plate assembly having a lower surface for connecting to the heating system component and an upper surface,
    a seal plate assembly having a lower surface for mating with the upper surface of the base plate assembly, the lower surface having a plurality of grooves therein,
    sealing material for inserting into the grooves,
    a hub assembly,
    a plurality of fasteners for connecting the seal plate assembly to the hub assembly, and
    a plurality of external brackets for connecting the seal plate assembly to the base plate assembly.

14. The kit of claim 13, wherein the base plate assembly, the seal plate assembly, and the hub assembly are annular rings.

15. The kit of claim 13, wherein the base plate assembly, the seal plate assembly, and the hub assembly include a pair of plates.

16. The kit of claim 13, wherein the plurality of fasteners include studs and disc springs.

17. The kit of claim 16, wherein the base plate assembly, the seal plate assembly, the hub assembly, and the brackets and the studs are made from stainless steel.

18. The kit of claim 13, further comprising a second sealing material configured to form a seal between a pipe extending from the heating system component and the hub assembly.

19. The kit of claim 18, wherein the first sealing material and the second sealing material include a flexible graphite composite.

20. The kit of claim 18, wherein the first sealing material and the second sealing material are annular gaskets.

* * * * *